Patented May 21, 1946

2,400,689

UNITED STATES PATENT OFFICE 2,400,689

2-AMINO-4:5-TRIMETHYLENE-THIAZOLE

Hans Erlenmeyer, Basel, Switzerland, assignor to Ciba Pharmaceutical Products Incorporated, Summit, N. J., a corporation of New Jersey No Drawing. Application April 27, 1942, Serial No. 440,694. In Switzerland June 14, 1941

3 Claims. (Cl. 260—302)

It has been found that cyclic aminothiazole derivatives can be obtained by causing thiourea or derivatives thereof mono- or di-substituted at the nitrogen atoms, as well as compounds capable of being converted into such thiourea compounds, to react with reactive esters of substituted or unsubstituted cyclic ketols whose ring containing the ketone group consists of at the most five carbon atoms.

The reaction takes place according to methods known in themselves. Reference is made for example to Richter-Anschütz, "Die Methoden der organischen Chemie," vol. III, page 141 (1931). The operation can be carried out in the presence or absence of solvents. As starting materials there may be used for example ammonium thiocyanate, thiourea, monomethylthiourea, symmetrical and unsymmetrical dimethylthiourea, corresponding ethyl- and propyl-thioureas, allylthiourea, diallylthiourea, ethylenethiourea, trimethylenethiourea, benzylthiourea and the like, as well as thioureas substituted by acyl radicals, for example acetylthiourea and benzoylthiourea.

The expression "reactive esters of cyclic ketols" as above used is understood to include especially the esters with hydrohalogen acids, alkyl- or aryl-sulfonic acids. As examples there may be named: 2-chlorocylopentanone, 2-bromocyclopentanone, sulfo-esters of α-hydroxycyclopentanone, for instance of the para-toluene sulfonic acid esters (obtained for example by the action of para-toluene sulfochloride on α-hydroxycyclopentanone or of sodium para-toluene sulfonate on α-chlorocyclopentanone, 2-chloro-1-methyl-cyclo-pentanone-(3), 2-chloro-3:3-methylethyl-cyclopentanone, 2-bromohydrindone-(1) as well as α-bromohydrindones containing further substituents in the phenyl nucleus. Further may be named cyclic ketones with a lower number of carbon atoms, such as α-bromocyclobutanone, obtained for example by the action of bromine on cyclobutanone. Further, the ring carrying the ketone group may also be unsaturated.

The cyclic ketones applied for the reaction can also be used in the form of their acetals.

The new compounds are of interest in therapeutics, special reference being made to their pressor effect on the blood.

The following example illustrates the invention, but is not regarded as limiting it in any way, the parts being by weight:

118.5 parts of α-chlorocyclopentanone are intimately mixed with 76 parts of thiourea and heated in small portions over the naked flame. A very vigorous reaction soon sets in and the 2-amino-4:5 - trimethylenethiazole - hydrochloride which has been formed solidifies in crystalline form. Little alcohol is added, the whole is vigorously stirred and then filtered. The new compound is obtained in colorless crystals by recrystallizing from dilute alcohol. It does not melt, but is charred above 200° C.

The hydrochloride is dissolved in water and the free base is precipitated with caustic soda solution. It crystallizes in the form of flakes which contain 1 mol. of crystal water. Melting point 124–125° C. from water.

If, however, the base is precipitated with ether and shaken out immediately, the ether solution separated immediately and dried with calcined potassium carbonate, the base is obtained in anhydrous state after evaporating the ether. It is obtained pure by recrystallization from dry hexane. It melts at 93–95° C. and has the following formula

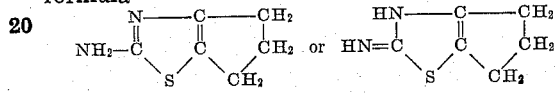

Also the other reactions described in the introduction can be carried out in analogous manner and compounds substituted at the nitrogen atoms or at the cyclopentene ring can thus be obtained.

What I claim is:

1. A member selected from the group consisting of the 2-amino-4:5-trimethylene-thiazole of the formula

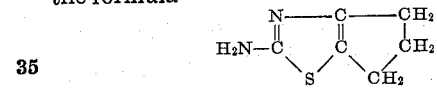

and the 2-imino-4:5-trimethylene-thiazole of the formula

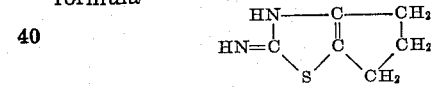

2. The 2-amino-4:5-trimethylene-thiazole of the formula

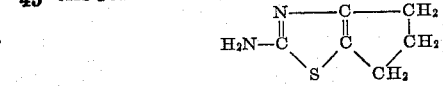

3. The 2-imino-4:5-trimethylene-thiazole of the formula

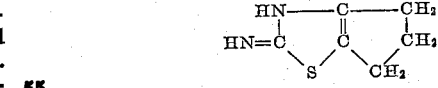

HANS ERLENMEYER.